United States Patent
Pedley et al.

(10) Patent No.: US 9,767,447 B2
(45) Date of Patent: Sep. 19, 2017

(54) NOTIFYING AN ATTENDANT WHEN A CUSTOMER SCANS AN OVERSIZED ITEM

(71) Applicant: Wal-Mart Stores, Inc., Bentonville, AR (US)

(72) Inventors: Douglas James Pedley, Portland, OR (US); Richard Neil Cancro, Portland, OR (US); Joel Bennett Acker, Jr., Brush Prairie, WA (US)

(73) Assignee: WAL-MART STORES, INC., Bentonville, AR (US)

( * ) Notice: Subject to any disclaimer, the term of this patent is extended or adjusted under 35 U.S.C. 154(b) by 786 days.

(21) Appl. No.: 13/753,434

(22) Filed: Jan. 29, 2013

(65) Prior Publication Data

US 2014/0214571 A1    Jul. 31, 2014

(51) Int. Cl.
 *G06Q 20/20* (2012.01)
 *G06Q 20/32* (2012.01)

(52) U.S. Cl.
 CPC ....... *G06Q 20/202* (2013.01); *G06Q 20/3224* (2013.01); *G06Q 20/3276* (2013.01)

(58) Field of Classification Search
 None
 See application file for complete search history.

(56) References Cited

U.S. PATENT DOCUMENTS

| | | | |
|---|---|---|---|
| 5,131,873 A | 7/1992 | Gierut | |
| 5,242,440 A | 9/1993 | Shippert | |
| 5,984,182 A * | 11/1999 | Murrah | G06Q 20/343 |
| | | | 235/375 |
| 6,587,835 B1 | 7/2003 | Treyz | |
| 6,659,344 B2 | 12/2003 | Otto | |
| 7,672,870 B2 | 3/2010 | Haines | |
| 2003/0195818 A1* | 10/2003 | Howell | G06Q 30/06 |
| | | | 705/26.8 |
| 2003/0200111 A1* | 10/2003 | Damji | G06Q 10/08345 |
| | | | 705/335 |
| 2005/0256782 A1 | 11/2005 | Sands | |
| 2005/0283402 A1 | 12/2005 | Mason | |
| 2013/0317949 A1* | 11/2013 | Gu | G06Q 30/06 |
| | | | 705/26.81 |

* cited by examiner

*Primary Examiner* — Paul Danneman
(74) *Attorney, Agent, or Firm* — Bryan Cave LLP

(57) ABSTRACT

A computer-implemented method for providing a product to a user includes determining that an item obtained by a mobile computing device corresponding to the user is indicative of an oversized item. A first notification is generated indicating the oversized item and retrieval information related to the oversized item. The first notification is transmitted to a first facility computing device corresponding to a first facility attendant. When the user completes a transaction for the purchase of the oversized product at one of the point of sale terminal, terminal information related to the point of sale terminal is obtained. A second notification is generated related to the terminal information. The second notification is transmitted to a second facility computing device corresponding to a second facility attendant.

12 Claims, 5 Drawing Sheets

NOTIFYING AN ATTENDANT WHEN A CUSTOMER SCANS AN OVERSIZED ITEM

BACKGROUND INFORMATION

Field of the Disclosure

The present invention relates generally to sending notifications to a computing device corresponding to a facility attendant. In particular, examples of the present invention are related to techniques for generating a notification indicating an oversized item and retrieval information related to the oversized item when a mobile computing device corresponding to a user obtains the oversized item.

Background

Shopping facilities are developing applications that allow users to use capabilities of their mobile computing devices to enhance their shopping experience. For instance, these applications can be tailored to deliver promotional information related to products explicitly preferred by the user or related to a purchase history of the user. Components of mobile computing devices are increasingly becoming more advanced, including GPS devices that can monitor and track locations, near field communication (NFC) devices that can transmit and receive radio frequency communications and camera devices that allow the mobile computing device to capture and scan images using dedicated software.

It is known, for example, for mobile computing devices to scan barcodes corresponding to products of interest. For instance, a user may scan a two dimensional barcode to learn a cost offered by a retailer for purchase of the product and compare that cost to other retailers. It is further known, for a user to scan a barcode corresponding to a product the user desires to purchase and store an item indicating the product in an electronic shopping cart. At a point of sale terminal, the user may transmit the item from the mobile computing device and conduct a transaction for the purchase of the product. Accordingly, the conventional checkout process of physically scanning each product at the point of sale is eliminated.

One drawback of allowing a user to scan an item and then purchase the item using a mobile computing device, is that only products the user is able to physically transport to the point of sale terminal, and leave the facility with, can be purchased. For instance, a user may be able to scan a barcode corresponding to a large television; however, due to the size of the television, the user is not able to transport the television by conventional means to a point of sale terminal. With oversized products such as televisions, the user would have to locate a facility attendant to retrieve the oversized product before or after the user purchases the product. Locating facility attendants can be an inconvenience to the user and result in time wasted that the user could have spent shopping.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
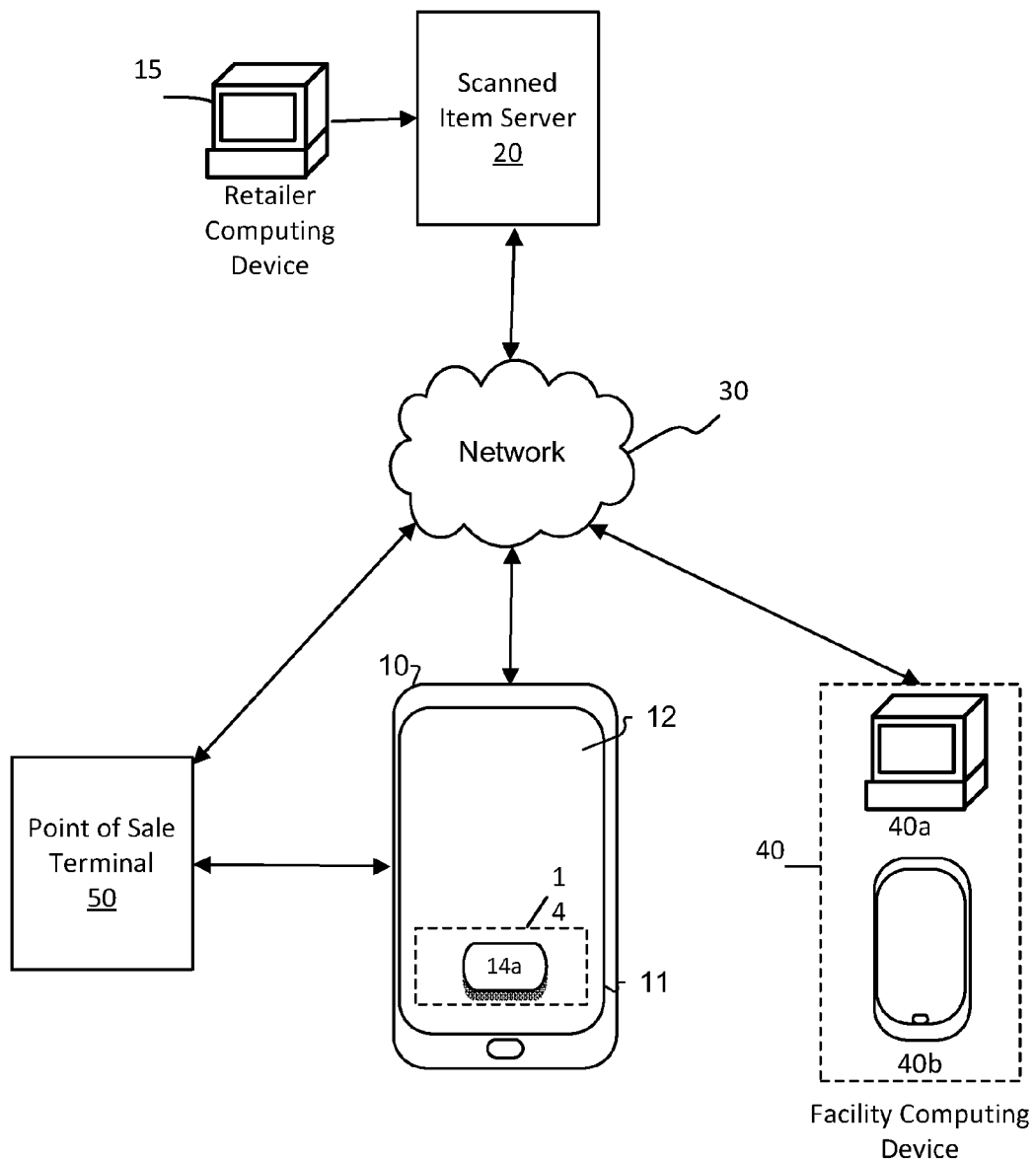
FIG. 1 schematically illustrates a scanned item server in communication with a mobile computing device displaying a graphical user interface, a point of sale terminal, and a facility computing device, in accordance with an exemplary embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. Techniques for generating a notification indicating an oversized item and retrieval information related to the oversized item when a mobile computing device obtains the oversized item, are described herein. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module". Furthermore, the present invention may take the form of a computer program product embodied in any tangible medium of expression having computer-usable program code embodied in the medium.

It may be desirable to provide a user the ability to obtain an oversized item indicating an oversized product with his or her mobile computing device, and then have a dedicated facility attendant transport the oversized product to the user after the user purchases the product at a point of sale terminal. As used herein, the term "user" can refer to a potential consumer, customer or shopper at a facility; and the term "facility" can refer to shopping venues, complexes and department stores. Notifying one or more facility attendants with an indication of the oversized item and providing retrieval information related to the oversized item, are described herein. As used herein, the term "product" can refer to groceries, foods, office supplies, furniture, electronics, power equipment, or any other fungible goods sold by the retailer; and the term "item" can refer to any type of indicator of a product sold by a retailer. Further, notifying one or more facility attendants with terminal information related to the point of sale terminal at which a completed transaction for the purchase of the oversized product occurred, are described herein. As used herein, the term "point of sale terminal" can refer to a self-checkout device or a human operated checkout device, e.g., cash register, facilitating a transaction for the purchase of products offered for sale by the retailer. Accordingly, users may not be restricted to only purchasing regular sized items, e.g., products fitting within a shopping cart, because notifying one or more dedicated facility attendants provides a measure to efficiently retrieve the oversized product such that it can be provided to the user upon the user purchasing the product.

Some users utilize the capabilities of their mobile computing devices to obtain and view information. For example, a user may obtain an item indicating a product the user desires to purchase. As used herein, the term "mobile computing device" can refer to mobile telephones, laptop computers, and tablet computers. In one embodiment, the mobile computing device obtains the item by scanning a barcode corresponding to the product. The obtained item can be stored in an electronic shopping cart and later used to purchase the product at a point of sale terminal, without going through the conventional method of scanning the item with a dedicated device at the point of sale terminal. As used herein, the term "electronic shopping cart" can refer to a list of one or more items indicating products the user intends to purchase at a point of sale terminal.

In accordance with various embodiments of the present disclosure, techniques are described for determining whether or not an item obtained by a mobile computing device is indicative of an oversized item. The oversized item indicates an oversized product the user is unable to transport from a currently stocked location within the facility to one or more point of sale terminals for purchase. For example, an item identifier may be obtained by the mobile computing device when the mobile computing device scans a barcode corresponding to the oversized product at a currently stocked location within the facility. Thereafter, physical attribute information related to the item can be retrieved from an item database using the item identifier. If the physical attribute information is indicative of an item that is oversized, the obtained item is determined indicative of the oversized item. In one embodiment, the physical attribute information includes size and weight information that is compared to respective size and weight thresholds. In another embodiment, the physical attribute information related to the item is simply recognized by the retailer as being indicative of an oversized item.

Furthermore, techniques are described for generating a first notification for transmission to one or more facility attendants that indicates the oversized item and retrieval information related to the oversized item. Generating the first notification can be performed at a processing device of a scanned item server furnished by the retailer. The facility computing device may include a stationary computing device or a mobile computing device. The retrieval information can include location specific information indicating one or more specific sections of the facility at which the oversized product is currently stocked. In one embodiment, the first notification includes a map of the facility including the one or more specific sections of the facility. Alternatively, or additionally, the first notification includes a location descriptor, e.g., aisle and or shelf number, indicating the one or more specific sections of the facility. The location specific information can be obtained by monitoring a location of the mobile computing device, e.g., using a GPS device, when the mobile computing device scans the item. Additionally, the location specific information can be obtained by receiving an item identifier broadcasted from the mobile computing device that corresponds to the oversized item. Thereafter, item information from an item database using the item identifier can be retrieved, wherein the item information includes the location specific information.

Techniques are further described for determining the user has completed a transaction for the purchase of the oversized product. For instance, the point of sale at which the completed transaction occurred can broadcast an electronic receipt indicating the purchase of the oversized product. Embodiments are directed toward the transaction for the purchase of the oversized product including the mobile computing device transmitting the obtained oversized item to one of the point of sale terminals to initiate purchase of the oversized product. For example, the obtained oversized item may be stored in an electronic shopping cart and transmitted to the point of sale terminal. Subsequently, the user may tender payment for the purchase of the oversized product directly to the point of sale terminal at which the mobile computing device transmitted the oversized item. For instance, the user may insert cash, swipe a debit/credit card or provide billing information using an item identifier at the point of sale.

Additionally, techniques are described for obtaining terminal information related to the point of sale terminal at which the completed transaction for the purchase of the oversized product occurred. The terminal information can be retrieved using a terminal identifier broadcasted from the point of sale terminal once the transaction is completed. The terminal information may include a specific section of the facility at which the point of sale terminal is located. Additionally or alternatively, the terminal information may include a unique identifier, e.g., aisle or lane number, that distinguishes the point of sale terminal from other point of sale terminals in the facility. The processing device may generate a second notification indicating the terminal information for transmission to the facility attendant or another facility attendant. For instance, the generated second notification transmitted to the facility attendant may include a map including the specific section of the facility and/or the unique identifier such that the facility attendant can quickly locate the user and provide the oversized product.

FIG. 1 illustrates a scanned item server 20 in communication with a mobile computing device 10, a facility computing device 40 and a point of sale terminal 50, via network 30. The scanned item server 20 further receives inputs from a retailer computing device 15. While one scanned item server 20 is illustrated, the term "scanned item server" refers to one or more servers that operate in an individual or distributed manner. While one retailer computing device 15 is illustrated, the term "retailer computing device" refers to one or more computing devices that operate to transmit one or more inputs to the scanned item server 20 for storing physical attribute information and location specific information of one or more items in an item database. For instance, a facility manager can operate the retailer computing device 15 to send inputs to the scanned item server 20 indicating size and weight information as new products being offered by the retailer arise. The retailer computing device 15 can be associated with one facility or the retailer computing device can be associated with a plurality of facilities. Further, as used herein, the term "network" can refer to any communication network including, but not limited to, a wireless network, a cellular network, an intranet, the Internet, or combinations thereof.

Embodiments of communication may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

In the illustrated example, the mobile computing device 10 is displaying a graphical user interface (GUI) 12 on a touch screen 11 of the mobile computing device 10. While a touch screen 11 is illustrated, it should be appreciated that other user interfaces can be used to allow a user to interact with the mobile computing device 10. The graphical user interface may display at least one operational input 14, e.g., push button 14a that allows the user to provide a command to the mobile computing device 10, the command causing the scanned item server 20 to perform one or more operations. Further, while one facility computing device 40 is present, the term "facility computing device" refers to one or more computing devices corresponding to one or more facility attendants that operate to receive one or more notifications transmitted from the scanned item server 20 for retrieving an oversized product and transporting the oversized product to a user upon completion of a transaction for the purchase of the oversized product. For instance, a facility attendant can receive a first notification indicating that an oversized product needs to be retrieved, and later, a second facility attendant may receive a second notification indicating a location of the point of sale terminal at which the oversized product was purchased so that the facility attendant can provide the oversized product to a user. The facility computing device 40 can include a stationary computing device 40a corresponding to a facility attendant stationed at a specific section of the facility, e.g., a furniture department service desk or a customer service desk, or a mobile computing device 40b corresponding to a facility attendant dedicated by the facility to retrieve and transport oversized items. While one point of sale terminal 50 is present, the term "point of sale terminal" refers to one or more terminals within the facility that a user may facilitate a transaction for the purchase of one or more products.

The scanned item server 20 may include a processing device that receives an item identifier obtained when the mobile computing device 10 scans a barcode corresponding to a product indicated by the item identifier. The processing device can retrieve physical attribute information related to the item and determine whether or not the item is indicative of an oversized item. Subsequently, the processing device can generate a first notification indicating the oversized item and retrieval information related to the oversized item and transmit the generated first notification to the facility computing device 40 via the network 30. In an exemplary embodiment, the generated first notification is transmitted to a first facility computing device 40 corresponding to a first facility attendant. Further, the processing device can receive a terminal identifier indicating the point of sale terminal at which the oversized product was purchased. In one embodiment, the terminal identifier is provided in an electronic receipt corresponding to the purchase. Using the terminal identifier, the processing device can retrieve terminal information that may include location specific information or a unique indicator corresponding to the point of sale terminal. Subsequently, the processing device can generate a second notification related to the terminal information and transmit the generated second notification to the facility computing device 40. In an exemplary embodiment, the second notification is transmitted to a second facility computing device corresponding to a second facility attendant, the second facility attendant corresponding to a facility attendant other than the first facility attendant. For instance, the second facility attendant can include a customer service attendant stationed proximate to the point of sale terminal and a facility entrance/exit. Here, the second facility attendant may receive the retrieved oversized product from the first facility attendant, and upon receiving the transmitted second notification, provide the oversized product to the user.

Any combination of one or more computer-usable or computer-readable media may be utilized in the processing device of the scanned item server. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Figure 2:
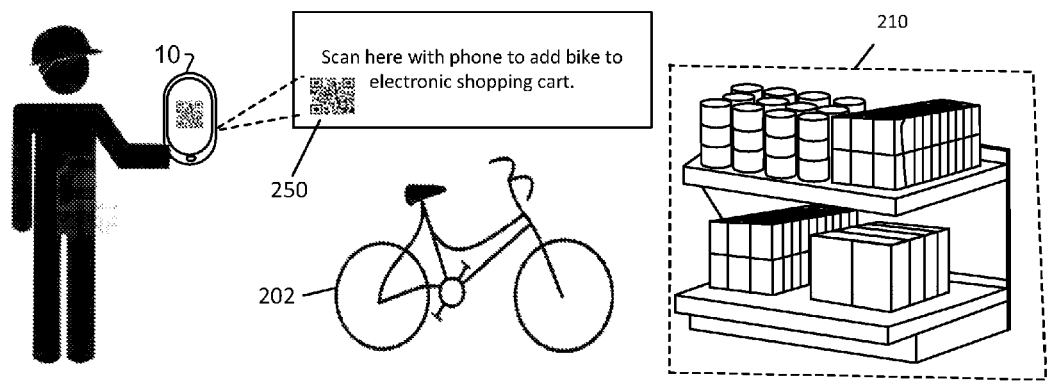
FIG. 2 schematically illustrates a non-limiting example of a mobile computing device scanning a barcode corresponding to a bicycle offered for sale by a retailer, in accordance with an exemplary embodiment of the present disclosure FIG. 3A-3D schematically illustrate non-limiting examples of generated notifications displayed on the facility computing device of FIG. 1.

FIG. 2 schematically illustrates a non-limiting example of the mobile computing device 10 of FIG. 1 scanning a barcode corresponding to a bicycle offered for sale by the retailer. A shelf apparatus includes a plurality of regularly sized items 210. It will be understood that any of the regularly sized items 210 may be easily transported by the user to a point of sale terminal. However, the bicycle 202 is oversized and the user may need assistance transporting the bicycle 202 to the point of sale terminal. In the illustrated example, the user scans a barcode 250 corresponding to the bicycle 202 at a specific section of the facility at which the bicycle 202 is currently stocked, e.g., sporting goods department. The barcode 250 may be a 1-dimensional barcode or a 2-dimensional barcode, such as a Quick Response code (QR code) as illustrated. Upon scanning the barcode 250 an item identifier corresponding to the bicycle 202 may be obtained and transmitted to the processing device of the scanned item server 20 of FIG. 1. The processing device may retrieve physical attribute information related to the bicycle from an item database using the item identifier. Thereafter, the processing device can determine that the bicycle 202 is indicative of the oversized product when the physical attribute information is indicative an item that is oversized. For instance, a size of the bicycle can exceed size threshold assigned by the retailer. Likewise, a weight of the bicycle can exceed a weight threshold assigned by the retailer. Similarly, the retailer may simply assign that the bicycle is indicative of a product that is oversized.

While the non-limiting example of FIG. 2 illustrates the user obtaining the item by scanning the barcode 250, the mobile computing device 10 may be equipped with an item reader configured to obtain items having radio frequency identification (RFID) tags or labels. In one embodiment, the item reader includes a near field communication (NFC) reader.

Upon determining the bicycle corresponds to an oversized product, the processing device may generate a first notification indicating the oversized item (i.e., indicating the oversized item) and retrieval information related to the oversized item and transmit the first notification to the facility computing device 40 of FIG. 1, e.g., a first facility computing device corresponding to a first facility attendant. Thereafter, the processing device can generate a second notification upon the completed transaction that is related to terminal information, wherein the second notification is transmitted to the facility computing device 40, e.g., a second facility computing device corresponding to a second facility attendant other than the first attendant. Additionally, the location of the mobile computing device 10 can be obtained via a GPS device of the mobile computing device when the barcode 250 is scanned.

In an exemplary embodiment, the processing device may transmit an interactive notification to the mobile computing device 10 to display an interactive graphic in the GUI 12. The interactive graphic displays information related to an inquiry by the retailer requesting whether or not the user desires the bicycle (e.g., oversized product) to be transported by a facility attendant. The inquiry allows the user to provide a command using the GUI 12 via the operational input 14, causing the processing device to generate the first notification. Accordingly, the user is allowed the option of retrieving the bicycle 202 and transporting the bicycle 202 to the point of sale terminal if the user so desires.

Figure 3A:
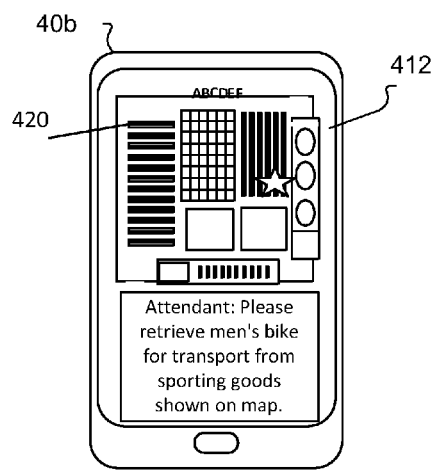
Figure 3B:
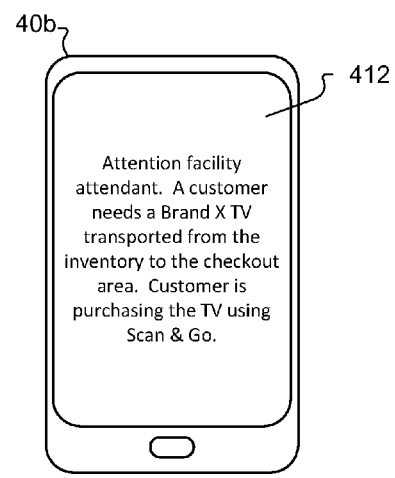

FIGS. 3A-3D illustrate non-limiting examples of notifications displayed on a graphical user interface (GUI) 412 or a display 413 of the facility computing device 40 of FIG. 1. It will be understood that the displayed notifications are not limited to any size or shape. Embodiments are envisioned where the notifications can first be displayed as a smaller graphical feature such as a banner displayed on a portion of the GUI 412 that can be enlarged upon a facility attendant input, e.g., tapping, to expand the size of the banner. In one embodiment, a generated first notification transmitted to the facility computing device 40 can indicate an oversized item and retrieval information related to the oversized item. FIGS. 3A and 3B illustrate non-limiting examples of a first notification indicating retrieval information for an oversized product. As illustrated in FIG. 3A, the first notification is displayed upon the GUI 412 of a mobile facility computing device 40b and includes a map 420 of the facility indicating the specific section of the facility (e.g., sporting goods department) at which the oversized product (e.g., bicycle) is located. Further, a location descriptor can be displayed indicating the specific section of the facility (e.g., sporting goods department) where the facility attendant can retrieve the oversized product (e.g., bicycle). As illustrated in FIG. 3B, the first notification is displayed upon the GUI 412 of a mobile facility computing device 40b and includes a location descriptor indicating the specific section of the facility (e.g., inventory) that the oversized product (e.g., Brand X TV) is currently stocked so that the facility attendant can retrieve the oversized product.

It will be understood that the first notification can be transmitted to more than one facility computing devices 40 corresponding to one or more facility attendants. The first notification may further include an interactive graphic allowing one or more facility attendants who receive the first notification to have the option of accepting the task of retrieving the oversized product via a command upon the GUI 412.

The examples of FIGS. 3A-3B are provided for example only and not intended to be limiting. It will be appreciated that the generated first notification is not limited to one type or classification, but each generated first notification may include any combination of the map of the facility and the location descriptor indicating one or more specific sections of the facility that the oversized product is currently stocked so that the a facility attendant may retrieve the oversized product.

Figure 3C:
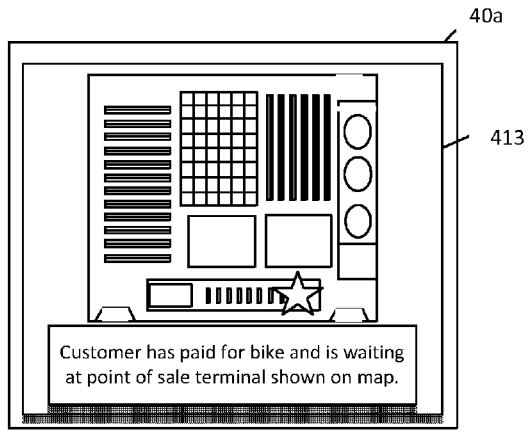
Figure 3D:
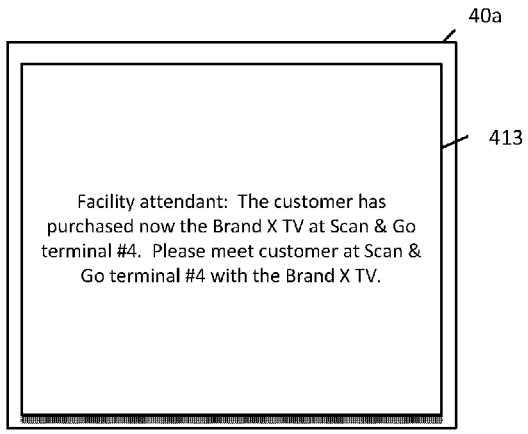

In another embodiment, a generated second notification transmitted to the facility computing device 40 can relate to terminal information. The terminal information may include at least one of terminal location specific information indicating a specific section of the facility at which a point of sale terminal is located and a unique indicator corresponding to the point of sale indicator that distinguishes the point of sale terminal from other point of sale terminals. In one embodiment, the facility computing device is a second facility computing device corresponding to a second facility attendant other than the first facility attendant. For example, the second facility attendant can include a facility attendant assigned to an area or section of the facility that is located proximate to the point of sale terminal 40 and an entrance/exit of the facility. FIGS. 3C and 3D illustrate non-limiting examples of second notifications related to terminal information displayed upon a display 413 of a stationary facility computing device 40a. As illustrated in FIG. 3C, the second notification is displayed upon the display 413 and includes a map of the facility including a specific section of the facility at which the point of sale terminal is located. As illustrated in FIG. 3D, the second notification is displayed upon the display 413 and includes a unique indicator corresponding to the point of sale terminal at which the user purchased the oversized product (e.g., Brand X TV). The unique indicator can include a number corresponding to the point of sale terminal. It will be appreciated that the second notification is used by a facility attendant to efficiently locate the user upon completing a purchase for the oversized product so that the facility attendant can provide the oversized product to the user upon the user leaving the facility.

The examples of FIGS. 3C-3D are provided for example only and not intended to be limiting. It will be appreciated that the generated second notification transmitted to the facility computing device 40 is not limited to one type or classification, but each generated second notification may include any combination of the map of the facility indicating the specific section of the facility at which the point of sale terminal executing the transaction for the purchase of the oversized product occurred and the unique indicator distinguishing the point of sale terminal from other point of sale terminals in the facility.

Figure 4:
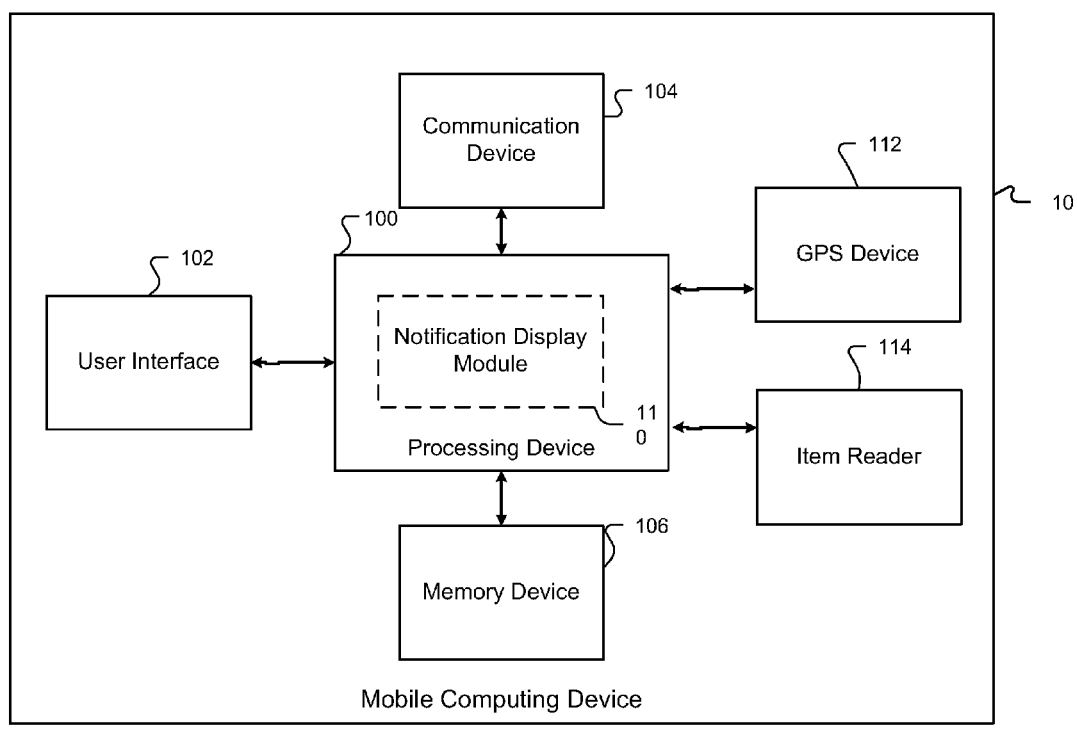
FIG. 4 is a block diagram illustrating components of the mobile computing device of FIG. 1.

Referring now to FIG. 4, a block diagram illustrating example components of the mobile computing device 10 of FIG. 1 is depicted. In the example embodiment, the mobile computing device 10 includes a processing device 100, a user interface 102, a communication device 104, a memory device 106, a GPS device 112 and an item reader 114.

The processing device 100 can include memory, e.g., read only memory (ROM) and random access memory (RAM), storing processor-executable instructions and one or more processors that execute the processor-executable instructions. In embodiments where the processing device 100 includes two or more processors, the processors can operate in a parallel or distributed manner. The processing device 100 can execute the operating system of the computing device. In the illustrative embodiment, the processing device 100 also includes a notification display module 110 for displaying an interactive notification transmitted from the scanned item server 20 of FIG. 1 displaying an inquiry requested by the facility of whether or not the user desires an oversized product to be transported by a facility attendant upon the user completing a transaction for the purchase of the oversized product at a point of sale terminal. The notification display module 110 may provide the interface graphic for the interactive notification in the GUI 12 and allow the user to provide the command to the scanned item server 20 to generate a first notification indicating retrieval information related to the oversized product.

The user interface 102 is a device that allows a user to interact with the computing device 10. While one user interface 102 is shown, the term "user interface" can include, but is not limited to, a touch screen, a physical keyboard, a mouse, a microphone, and/or a speaker. The communication device 104 is a device that allows the mobile computing device 10 to communicate with another device, e.g., the scanned item server 20, via the network 30, and the point of sale terminal 50 via wireless communications. The communication device 104 can include one or more wireless transceivers for performing wireless communication and/or one or more communication ports for performing wired communication. The memory device 106 is a device that stores data generated or received by the mobile computing device 10. The memory device 106 can include, but is not limited to a hard disc drive, an optical disc drive, and/or a flash memory drive. The memory device 106 can include storage for an electronic shopping cart corresponding to one or more items indicating one or more products the user intends to purchase at the point of sale terminal 50. The GPS device 112 can provide a location of the mobile computing device 10 within the facility. The location of the mobile computing device 10 can be obtained by the scanned item server 20 to monitor the location of an item, e.g., oversized item, obtained by the mobile computing device 10. Subsequently, the scanned item server 20 can generate and transmit a first notification indicating retrieval information that includes a specific section of the facility that the oversized product is currently stocked based on the location of the mobile computing device 10. The item reader 114 can obtain an item. In one embodiment, the item reader can include a camera device configured to capture and scan a barcode corresponding to a product, e.g., an oversized product. In another embodiment the item reader can include an NFC reader configured to obtain an item identifier broadcasted from an RFID tag or label corresponding to the product, e.g., the oversized product. The item identifier can be used to retrieve location specific information indicating one or more specific sections of the facility at which the oversized product is currently stocked.

Figure 5:
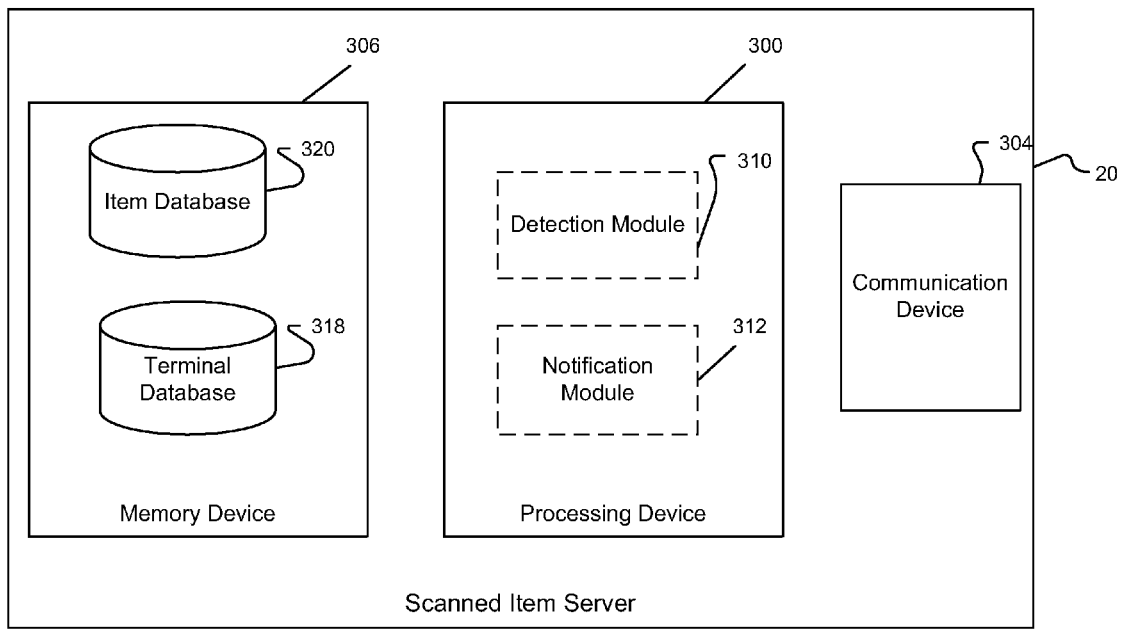
FIG. 5 is a block diagram illustrating components of the scanned item server of FIG. 1.

Referring now to FIG. 5, a block diagram illustrating an exemplary scanned item server 20 is depicted. In an exemplary embodiment, the scanned item server 20 includes a processing device 300, a communication device 304, and a memory device 306.

The processing device 300 can include memory, e.g., read only memory (ROM) and random access memory (RAM), storing processor-executable instructions and one or more processors that execute the processor-executable instructions. In embodiments where the processing device 300 includes two or more processors, the processors can operate in a parallel or distributed manner. In the illustrative embodiment, the processing device 300 executes a detection module 310 and a notification module 312, which are described in greater detail below.

The detection module 310 receives an item identifier broadcasted from the mobile computing device 20 of FIG. 1 via the network 30. For instance, the mobile computing device 10 can automatically broadcast the item identifier upon obtaining an item. The detection module 310 further receives a terminal identifier broadcasted from the point of sale terminal 40 of FIG. 1 via the network. The terminal identifier may be included within an electronic receipt after a transaction is executed at the point of sale terminal 40.

The notification module 312 determines whether the item obtained by the mobile computing device 10 is indicative of an oversized item using the item identifier received at the detection module 310. The notification module 312 further generates a first notification indicating the oversized item and retrieval information related to the oversized item. The generated first notification can include any combination of a map of the facility and a location descriptor indicating one or more specific sections of the facility that the oversized product is currently stocked, as discussed above in the non-limiting examples provided in FIGS. 3A-3B. The notification module 312 further transmits the generated first notification to the facility computing device 40 of FIG. 1. In one embodiment, the generated first notification is transmitted to a first facility computing device corresponding to a first facility attendant.

The notification module 312 further determines whether a user has completed a transaction for the purchase of an oversized product at the point of sale terminal 40 of FIG. 1. For instance, an electronic receipt may be broadcasted from the point of sale terminal 40 at which the completed transaction for the purchase of the oversized product occurred. The electronic receipt may indicate one or more purchased items, wherein one of the purchased items indicates the purchase of the oversized product. The notification module 312 further obtains terminal information related to the point of sale terminal 40. For instance, the notification module may retrieve the terminal information upon receiving a terminal identifier broadcasted from the point of sale terminal 40 when the transaction is completed. In one embodiment, the terminal identifier may be included within the electronic receipt as discussed above. Thereafter, the notification module 412 generates a second notification related to the terminal information. The generated second notification may include any combination of the map of the facility indicating the specific section of the facility at which the point of sale terminal executing the transaction for the purchase of the oversized product occurred and the unique indicator distinguishing the point of sale terminal from other point of sale terminals in the facility, as discussed above in the non-limiting examples provided in FIGS. 3C-3D. The notification module 312 further transmits the generated second notification to the facility computing device 40. In an exemplary embodiment, the generated second notification is transmitted to a second facility computing device corresponding to a second facility attendant other than the first facility attendant.

The communication device 304 is a device that allows the scanned item server 20 to communicate with another device, e.g., the mobile computing device 10, the facility computing device 40 and the point of sale terminal 50, via the network 20. The communication device 304 can include one or more wireless transceivers for performing wireless communication and/or one or more communication ports for performing wired communication.

The memory device 306 is a device that stores data generated or received by the scanned item server 20. The memory device 306 can include, but is not limited to, a hard disc drive, an optical disc drive, and/or flash memory drive. Further, the memory device 306 may be distributed and located at multiple locations. The memory device 306 is accessible to the processing device 300.

An item database 320, or similar structure, can be stored in the memory device 306. In an exemplary embodiment, a retailer maintains the item database 320 to input and store physical attribute information of one or more products offered for sale by the retailer. For instance, a facility manager can input physical attribute information such size and weight information relating to products for storage in the item database 320 via the retailer computing device 15 of FIG. 1. The notification module 312 retrieves the physical attribute information for determining whether an item indicating the product is indicative of an oversized item. In another exemplary embodiment, a retailer maintains the item database 320 to input and store retrieval information including location specific information indicating one or more specific sections of the facility products are currently stocked. For instance, a facility manager can input retrieval information relating to currently stocked products for storage in the item database 320 via the retailer computing device 15. The notification module 312 further retrieves the retrieval information stored in the item database 320 for generating a first notification.

Additionally, a terminal database 318, or similar structure, can be stored in the memory device 306. In an exemplary embodiment, the retailer maintains the terminal database 318 to store terminal information for a plurality of point of sale terminals. The terminal information includes terminal location specific information including a specific section of the facility at which a point of sale terminal is located. The terminal information further includes a unique indicator corresponding to the point of sale terminal that distinguishes it from other point of sale terminals. The notification module 312 may then retrieve the terminal information stored in the terminal database 318 and generate a second notification based thereon.

Figure 6:
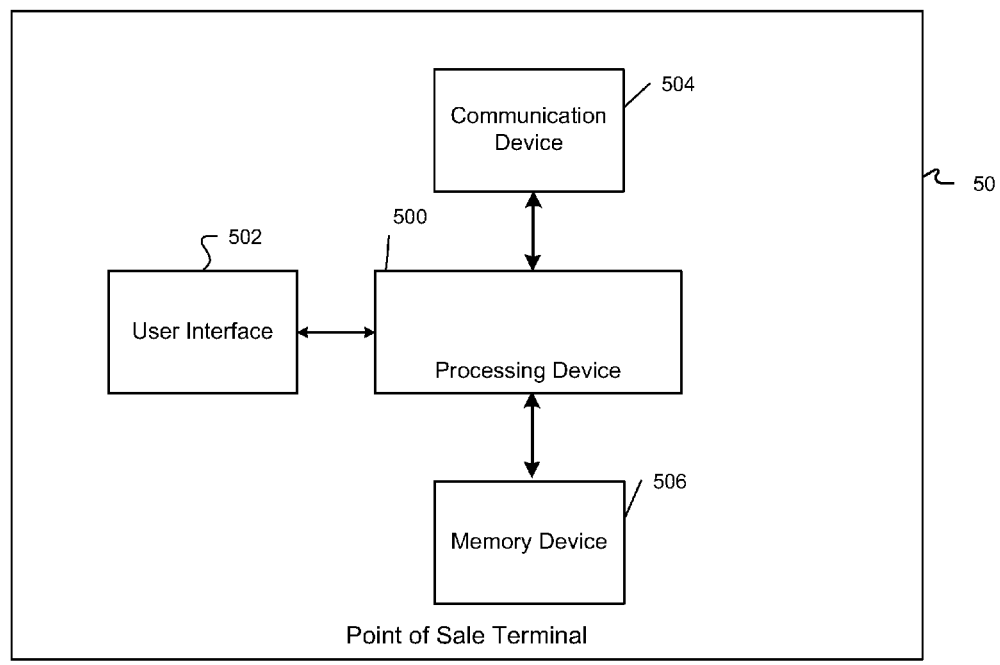
FIG. 6 is a block diagram illustrating components of the point of sale terminal of FIG. 1.

Referring now to FIG. 6, a block diagram illustrating example components of the point of sale terminal of FIG. 1 is depicted. In the example embodiment, the point of sale terminal 50 includes a processing device 500, a user interface 502, a communication device 504, and a memory device 506.

The processing device 500 can include memory, e.g., read only memory (ROM) and random access memory (RAM), storing processor-executable instructions and one or more processors that execute the processor-executable instructions. In embodiments where the processing device 500 includes two or more processors, the processors can operate in a parallel or distributed manner. The processing device 500 can execute the operating system of the point of sale terminal, such as executing a transaction with a user for the purchase of one or more products when one or more items indicating the one or more products are transmitted to the point of sale terminal 40.

The user interface 502 is a device that allows a user to interact with the computing device 10. While one user interface 102 is shown, the term "user interface" can include, but is not limited to, a touch screen, a physical keyboard, a mouse, a microphone, a debit/credit card reader and/or a speaker. The communication device 104 is a device that allows the point of sale terminal 40 to communicate with another device, e.g., the scanned item server 20, via the network 30, and the mobile computing device 10 via wireless communications. The communication device 504 can include one or more wireless transceivers for performing wireless communication and/or one or more communication ports for performing wired communication. The memory device 106 is a device that stores data generated or received by the mobile computing device 10. The memory device 506 can include, but is not limited to a hard disc drive, an optical disc drive, and/or a flash memory drive. The memory device 506 can include storage for an electronic receipt listing one or more items corresponding to products purchased by a user at the point of sale terminal.

The flowchart and block diagrams in the flow diagram illustrates the architecture, functionality, and operation of possible implementations of methods and computer program products according to various embodiments of the present invention. In this regard, each block in the flowchart or block diagram may represent a module, segment, or portion of code, which comprises one or more executable instructions for implementing the specified logical function(s). It will also be noted that each block of the block diagram and/or flowchart illustration, and combinations of blocks in the block diagram and/or flowchart illustration, may be implemented by special purpose hardware-based computers that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Figure 7:
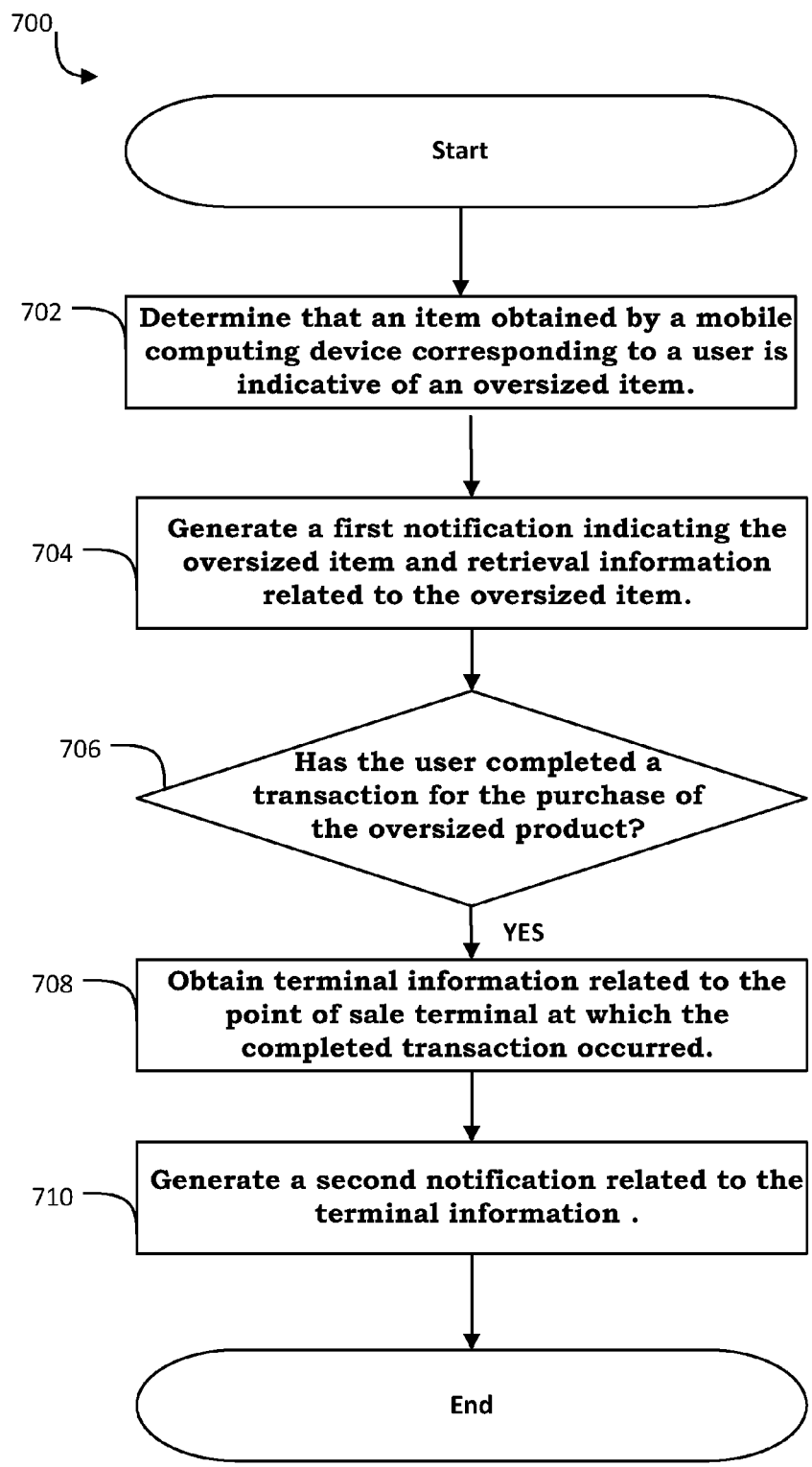
FIG. 7 is a flowchart illustrating an example method for generating first and second notifications, in accordance an exemplary embodiment of the present disclosure.

FIG. 7 illustrates an example method of a flowchart 700 that can be executed by the scanned item server 20 sending notifications from the scanned item server 20 to the facility computing device 10 corresponding to a facility attendant. At operation 702, the detection module 310 receives an item identifier broadcasted from the mobile computing device 10. The item identifier corresponds to an item obtained by the mobile computing device when the mobile computing device 10 scans a barcode corresponding to a product indicated by the item. Alternatively, the mobile computing device 10 may include an NFC reader to obtain the item by reading the item identifier broadcasted from an RFID label or tag corresponding to the product. Using the item identifier, the notification module 312 retrieves physical attribute information of the item from the item database 320 and determines the item is indicative of an oversized item based on the physical attribute information. The flowchart 700 proceeds to operation 704.

At operation 704, the notification module 312 generates a first notification indicating the oversized item and retrieval information related to the oversized item. As aforementioned, the retrieval information includes location specific information indicating one or more specific sections of the facility at which the oversized product is currently stocked. In one embodiment, the location specific information is received from the mobile computing device 10 based on the location of the mobile computing device 10 when the item was obtained. In another embodiment, the notification module 312 can obtain the location specific information by retrieving the location specific information stored in the item database 320 using the item identifier. The generated first notification can include at least one of a map and a location descriptor indicating the one or more specific sections of the facility described above in the non-limiting examples of FIGS. 3A-3B. The generated first notification is transmitted to a first facility computing device 40 corresponding to a first facility attendant. The flowchart then proceeds to operation 706.

At operation 706, the notification module 312 determines if the user has completed a transaction for the purchase of the oversized product. As aforementioned, the notification module 312 can determine the user has completed the transaction when an electronic receipt is broadcasted from the point of sale terminal at which the completed transaction occurred. It will be understood that the transaction for the purchase of the oversized product includes the mobile computing device 10 transmitting the obtained oversized item to a point of sale terminal to initiate purchase of the oversized product. The user may then tender payment for the purchase of the oversized product to the point of sale terminal. The flowchart 706 only proceeds to operation 708 when the user has completed the transaction.

At operation 708, terminal information related to the point of sale terminal at which the completed transaction occurred is obtained by the notification module 312 obtained. As aforementioned, the notification module 312 can retrieve the terminal information from the terminal database 318 using a terminal identifier broadcasted from the point of sale terminal at which the transaction for the purchase of the oversized product occurred. After the terminal information is obtained, the flowchart 700 proceeds to operation 710. At operation 710, the notification module 312 generates a second notification related to the terminal information. For instance, the generated second notification may include a map of the facility including the specific section of the facility that the point of sale terminal is located. Alternatively or additionally, the generated second notification may include the unique identifier. Non-limiting examples of generated second notifications are described above in FIGS. 3C-3D. The generated second notification is then transmitted to a second facility computing device corresponding to a second facility attendant. The second facility attendant can include a facility attendant other than the first facility attendant. For instance, the second facility attendant may include an attendant stationed at a facility service desk proximate to the point of sale terminals and the entrance/exit of the facility. Whereas, the first facility attendant may include a roaming attendant that retrieves the oversized product and transports it to the second facility attendant where the oversized product awaits until the user finishes shopping in the facility and completes the transaction for the purchase of the oversized product at one of the point of sale terminals.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A computer-implemented method for providing a product to a user at one of a plurality of sale terminals furnished within a facility of a retailer, comprising:
   providing a scanned item server;
   providing an application installed on a mobile computing device corresponding to the user and communicatively coupled to the scanned item server;
   determining, at a processing device of the scanned item server, that an item selected by the user on the application is indicative of an oversized item, the oversized item indicating an oversized product the user is unable to transport from a currently stocked location within the facility to the one of the plurality of sale terminals for purchasing the oversized item, wherein the item selected by the user on the application is determined indicative of the oversized item by:
      receiving, at the processing device, an item identifier from the application,
      retrieving, at the processing device, physical attribute information related to the item from an item database using the item identifier, and
      determining, at the processing device, that the physical attribute information exceeds a predetermined threshold;
   generating, at the processing device, a first notification comprising a first map of the facility, the first map annotated with a current location of the oversized item for retrieval by a first facility attendant, the current location indicated by a visual representation of a specific section of the facility and a textual location descriptor comprised of at least one of an aisle identifier, a lane identifier, or a shelf identifier, wherein the current location is determined by:
      monitoring, at the processing device, a location of the mobile computing device when the user selects the oversized item, the location of the mobile computing device being received from the mobile computing device, and
      determining, at the processing device, the current location of the oversized item corresponds to the location of the mobile computing device;
   transmitting, at the processing device, the first notification to a first facility computing device corresponding to the first facility attendant;
   determining that the user has completed a transaction for the purchase of the oversized item by receiving, at the processing device, an electronic receipt broadcasted from the one of the plurality of sale terminals at which the transaction for the purchase of the oversized item occurred, the electronic receipt indicating one or more purchased items, one of the one or more purchased items indicating the purchase of the oversized item and a terminal identifier corresponding to the one of the plurality of sale terminals at which the user purchased the oversized item;
   upon determining the user has completed the transaction:
      obtaining, at the processing device, terminal information related to the one of the plurality of sale terminals at which the transaction for the purchase of the oversized item occurred, including at least the terminal identifier from the electronic receipt;
determining a location of the one of the plurality of sale terminals;
generating, at the processing device, a second notification related to the terminal information, wherein the second notification includes at least a second map of the facility annotated with a current location of the user, the current location of the user indicated by a visual representation of a specific section of the facility and a textual location descriptor including at least a sale terminal identifier indicating one of the plurality of sale terminals; and
transmitting, at the processing device, the second notification to a second facility computing device corresponding to a second facility attendant.

2. The method of claim 1, wherein the item identifier corresponds to the item and selected by the user on the application when the mobile computing device scans a barcode corresponding to the oversized item at the currently stocked location within the facility; and wherein
the item database stores the physical attribute information for a plurality of items offered for sale by the retailer.

3. The computer-implemented method of claim 1, wherein the first notification is generated when the processing device transmits an interactive notification to the application upon determining the item is indicative of the oversized item, the interactive notification prompting the application to display an interactive graphic in a graphical user interface of the mobile computing device, wherein the interactive graphic displays information related to an inquiry by the retailer requesting whether or not the user desires the oversized item to be transported by the first facility attendant after the transaction for the purchase of the oversized item is completed, the inquiry allowing the user to provide a command using the graphical user interface causing the processing device to generate the first notification.

4. The computer-implemented method of claim 1, wherein the transaction for the purchase of the oversized item includes the application transmitting information about the oversized item obtained to one of the plurality of sale terminals to initiate purchase of the oversized item; and the user tendering payment for the purchase of the oversized item to the one of the plurality of sale terminals at which the application transmitted the information about the oversized item.

5. The computer-implemented method of claim 1, wherein obtaining the terminal information further includes:
retrieving, at the processing device, the terminal information from a terminal database using the terminal identifier, the terminal database storing the terminal information for the plurality of sale terminals, the terminal information includes at least a unique indicator corresponding to a sale terminal that distinguishes the sale terminal from other sale terminals.

6. The computer-implemented method of claim 1, wherein the second facility attendant corresponds to a facility attendant other than the first facility attendant.

7. A system for providing a product to a user at one of a plurality of sale terminals furnished within a facility of a retailer, the system comprising:
an application installed on a mobile computing device corresponding to a user;
a scanned item server communicatively coupled to the application, the scanned item server comprising a notification module that:
determines that an item selected by the user on the application is indicative of an oversized item, the oversized item indicating an oversized item the user is unable to transport from a currently stocked location within the facility to the one of the plurality of sale terminals for purchasing the oversized item, wherein the item selected by the user on the application is determined indicative of the oversized item by:
receiving an item identifier from the application,
retrieving physical attribute information related to the item from an item database using the item identifier retrieving, at a processing device of the scanned item server, the physical attribute information related to the item from the item database using the item identifier, wherein the physical attribute information includes at least size and weight data,
comparing, by the processing device, the physical attribute information to at least one predetermined threshold stored on the scanned item server, and
determining, at the processing device, that the physical attribute information exceeds the at least one predetermined threshold;
generates a first notification comprising a first map of the facility, the first map annotated with a current location of the oversized item for retrieval by a first facility attendant, the current location indicated by a visual representation of a specific section of the facility and a textual location descriptor comprised of at least one of an aisle identifier, a lane identifier, or a shelf identifier, wherein the current location is determined by:
monitoring, at the processing device, a location of the mobile computing device when the user selects the oversized item, the location of the mobile computing device being received from the mobile computing device, and
determining, at the processing device, the current location of the oversized item corresponds to the location of the mobile computing device;
transmits the first notification to a first facility computing device corresponding to the first facility attendant;
determines that the user has completed a transaction for the purchase of the oversized item by receiving, at the processing device, an electronic receipt broadcasted from the one of the plurality of sale terminals at which the transaction for the purchase of the oversized item occurred, the electronic receipt indicating one or more purchased items, one of the one or more purchased items indicating the purchase of the oversized item and a terminal identifier corresponding to the one of the plurality of sale terminals at which the user purchased the oversized item;
upon determining the user has completed the transaction, the notification module further:
obtains terminal information related to the one of the plurality of sale terminals at which the transaction for the purchase of the oversized item occurred, including at least the terminal identifier from the electronic receipt;
determines a location of the one of the plurality of sale terminals;
generates a second notification related to the terminal information, wherein the second notification includes at least a map of the facility annotated with a current location of the user, the current location of the user indicated by a visual representation of a specific section of the facility and a textual location descriptor including at least a sale terminal identifier indicating one of the plurality of sale terminals; and transmits the second notification to a second facility computing device corresponding to a second facility attendant.

8. The system of claim 7, wherein the item identifier corresponds to the item and selected by the user on the application when the mobile computing device scans a barcode corresponding to the oversized item at the currently stocked location within the facility; and wherein the item database stores the physical attribute information for a plurality of items offered for sale by the retailer.

9. The system of claim 7, wherein the first notification is generated when the processing device transmits an interactive notification to the application upon determining the item is indicative of the oversized item, the interactive notification prompting the application to display an interactive graphic in a graphical user interface of the mobile computing device, wherein the interactive graphic displays information related to an inquiry by the retailer requesting whether or not the user desires the oversized item to be transported by the first facility attendant after the transaction for the purchase of the oversized item is completed, the inquiry allowing the user to provide a command using the graphical user interface causing the processing device to generate the first notification.

10. The system claim 7, wherein the transaction for the purchase of the oversized item includes the application transmitting information about the oversized item obtained to the one of the plurality of sale terminals to initiate purchase of the oversized item; and the user tendering payment for the purchase of the oversized item to the one of the plurality of sale terminals at which the application transmitted the information about the oversized item.

11. The system of claim 7, wherein the notification module obtains the terminal information by:
retrieving the terminal information from terminal database using the terminal identifier, the terminal database storing the terminal information for the plurality of sale terminals, the terminal information includes at least a unique indicator corresponding to a sale terminal that distinguishes the sale terminal from other sale terminals.

12. The system of claim 7, wherein the second facility attendant corresponds to a facility attendant other than the first facility attendant.

* * * * *